May 22, 1956
P. M. BOURDON
2,746,804
DETACHABLE WHEELS FOR VEHICLES
Filed Jan. 21, 1953
2 Sheets-Sheet 1
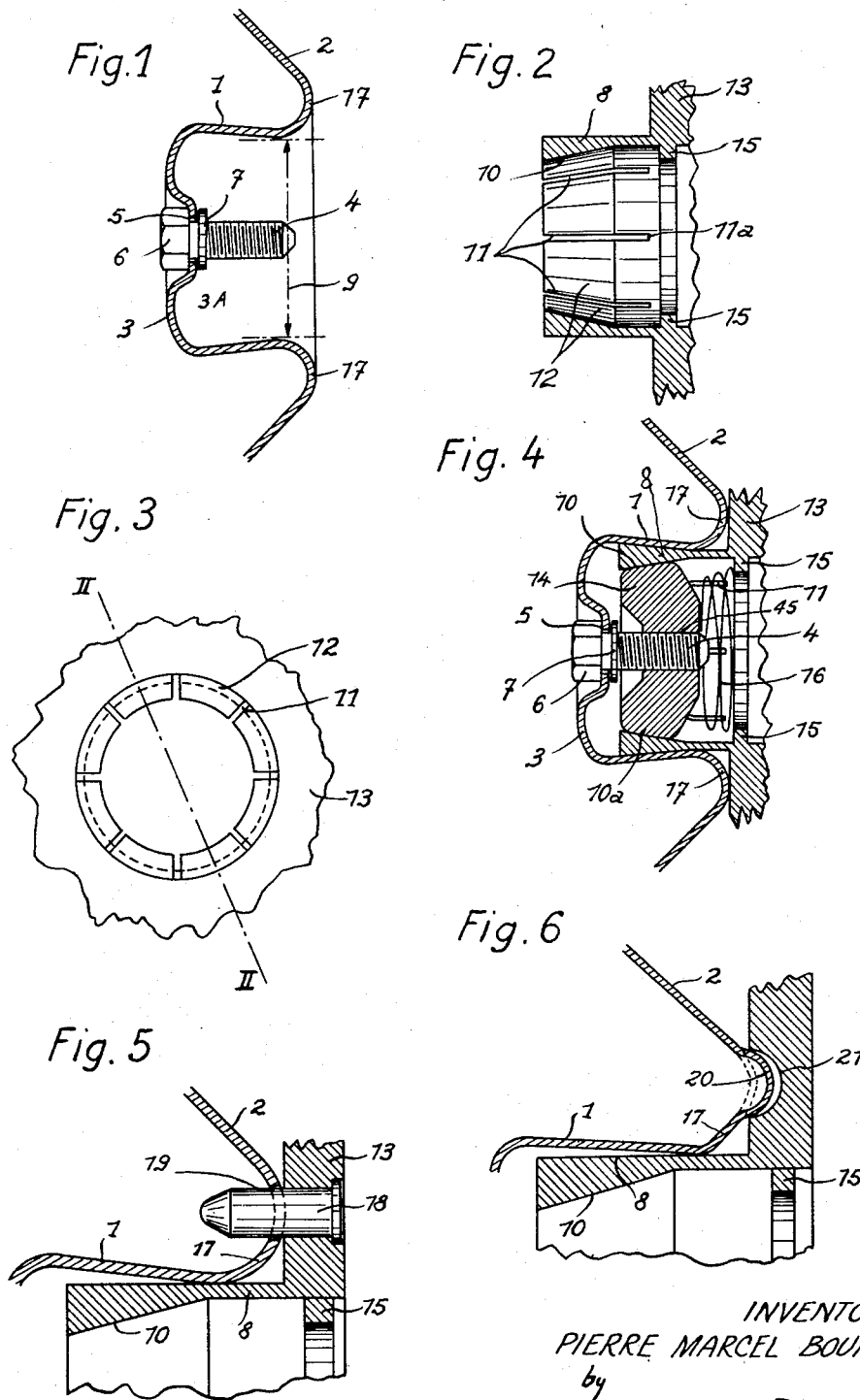
INVENTOR
PIERRE MARCEL BOURDON
by
Campbell, Brumbaugh, Free & Graves
his ATTORNEYS

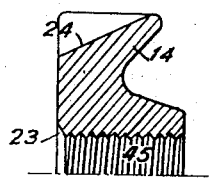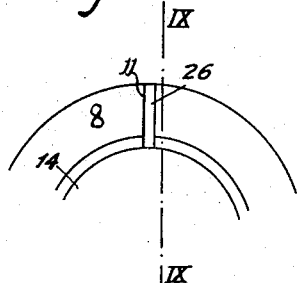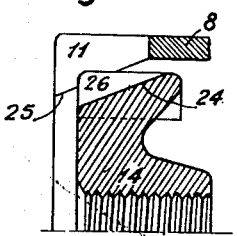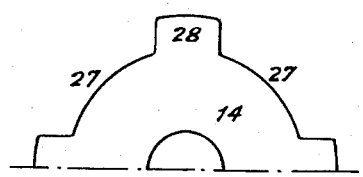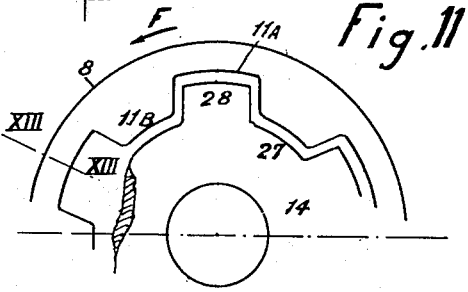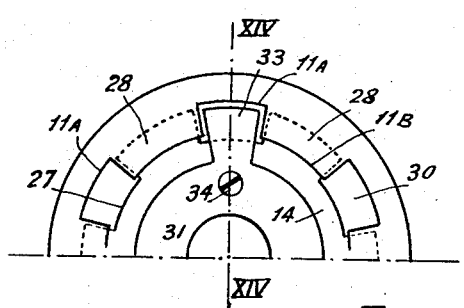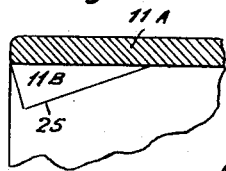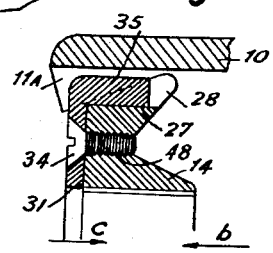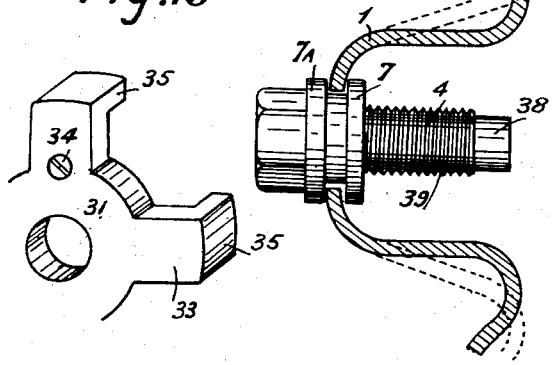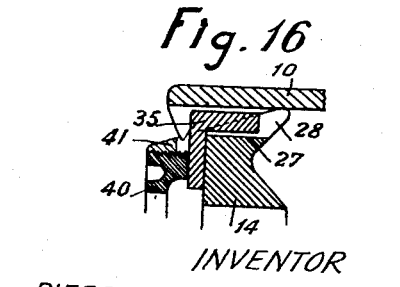

United States Patent Office 2,746,804
Patented May 22, 1956

2,746,804
DETACHABLE WHEELS FOR VEHICLES

Pierre Marcel Bourdon, Paris, France, assignor to Compagnie Generale des Etablissements Michelin, Clermont-Ferrand, France Application January 21, 1953, Serial No. 332,226

Claims priority, application France March 11, 1952

9 Claims. (Cl. 301—9)

This invention relates to detachable wheels of the type having central securing means for attaching the wheel to a stub axle of the vehicle, and more particularly to these securing means, and is especially applicable to wheels for motor vehicles.

The known central securing means of the central type (i. e. comprising a stub axle on which is fitted a central bore of the wheel centre, the wheel being locked in place by a central nut or nut like member axially adjustable relatively to said stub axle) necessitate a precise fitting between the wheel centre and the stub axle, in order to permit easy changing or mounting of the wheel in a simple operation and to ensure that the wheel when in position on the stub axle is held fast against any tendency to shift due to the alternating stresses set up by traction and braking forces. Such means generally comprise longitudinal cooperating grooves in a bore in the wheel centre and on the stub axle which necessitate precise and costly machining operations of the parts.

The present invention has for its object a central securing device for a wheel which is detachable from the stub axle, in which there is an initial clearance between the interior surface of a bore or recess in the wheel centre and the external surface of the stub axle, permitting easy shifting of the wheel into position, this clearance being totally removed after the wheel is in place by the simple operation of a central locking element, the effect of which is to deform resiliently at least one of the two members in question (the recess in the wheel centre and the stub axle on which said wheel is mounted) in order to obtain between them a firm contact over an appreciable surface.

The invention is illustrated in the accompanying drawings, in which are represented several embodiments of the invention.

Figure 1 is an axial section of the central part of the wheel constructed in accordance with the invention and having a central bore or recess whereas Figure 2 is a corresponding section taken on line II—II of Figure 3 by stub axle coacting with said recess.

Figure 3 is an end view of the stub axle, seen from the left of Figure 2.

Figure 4 is an axial section showing the wheel centre in position on the stub axle.

Figures 5 and 6 are part sectional views on an enlarged scale showing two different forms of additional means for better ensuring the connection of the wheel body to the stub axle of the vehicle.

Figure 7 is an axial section of a half of another embodiment of a central nut-like locking element of a device according to this invention.

Figure 8 is a fragmentary front view of the central locking element of Figure 7, showing projections or keys intended to prevent rotation of said element in relation to the wheel, on relative axial displacement of these two members.

Figure 9 is a section on the line IX—IX of Figure 8.

Figure 10 is a half front view showing a modified construction of the central locking element of Figure 8.

Figures 11 and 12 show two stages in the assembling, in the interior of the wheel centre, of the central locking element shown in Figure 10.

Figure 13 is a section on the line XIII—XIII of Figure 11 and Figure 14 a section on the line XIV—XIV of Figure 12.

Figure 15 is a part perspective view of an assembly member used in the fixing means of Figures 11–14.

Figure 16 is a modification of Figure 14.

Figure 17 shows a further modification of the central actuating screw of the device and of the central part of the wheel in which this actuating screw is mounted.

Referring to the drawings, 2 indicates the wheel disc or body which carries or is integral with the tire-supporting rim (not shown). The wheel body 2 has an outwardly projecting central portion or boss 1, which, in the embodiment shown in Figures 1–6, is flared outwardly and closed at its outer end by a wall 3, thus enclosing a recess 3A. An actuating screw 4 is carried axially in the boss 1, a central hole 5 being formed in the approximately vertical wall 3 of the boss 1, in which the screw 4 is mounted so as to be able to turn freely. The screw 4 has a hexagonal head 6 outside the wall 3 and a flange 7 adjacent to the internal face of the wall 3. Thus, pressure can be applied through the interior and exterior faces of this wall 3 whilst the screw is turning freely. In order to permit insertion of the screw 4, the head 6, or the flange 7, or both, are not made as a unit with the stem of the screw 4 but are fixed to this stem after introducing the stem into the hole 5. In accordance with common practice, the axle of the vehicle carries near each of its ends a plate or disc 13 (Figure 2) serving as an abutment for the central part of the wheel. In the centre of said disc is a projection or stub axle 8, onto which the central boss 1 of the wheel is driven and secured. According to the said embodiment of the invention, said stub axle 8 is in the form of an expandible annular sleeve whose external diameter is slightly less than the smallest internal diameter 9 of the central recess 3A of the wheel.

Internally, the stub axle end is formed entirely or partly of its length, with a conical or tapered recess 10, which is of decreasing cross section in an outwards direction. Radial slots 11 are cut in the sleeve 8 providing intermediate tongues 12 capable of flexing about their base 11A.

Mounted in the interior of the conical recess 10 is a central fixing or locking element, which as shown in Figure 4 may comprise a nut 14 (Figure 4) having a frusto-conical perimeter 10a corresponding to that of the recess 10 and which is capable of axial displacement without turning. When the nut 14 is drawn outwardly, it causes an outwards flexing of the tongues 12 from whence there results a diametral expansion of the sleeve 8. When the wheel construction is such that the nut 14 can be introduced from the inside (from the right of Figure 2) of the disc 13, it can be positioned without difficulty, but when this is not the case, the nut 14 is positioned by any suitable known means: For example, the nut 14 is formed in two or more separable radial pieces, which can be introduced from the left of Figure 2 in a dismantled state and which can then be assembled in the interior of the recess 10.

Since it is essential that the nut 14 should not be capable of turning in the recess 10 of the hub 8, this can be ensured by maintaining permanent frictional contact between the exterior surface 10A of the locking element 14 and the interior surface of the recess 10 of the hollow boss 8. In one arrangement, the recess 10 is provided with an annular shoulder 15 against which bears a spring member, for example a coil spring 16, whose other end bears against the rear face of the nut 14. It is also possible to prevent the nut from turning by providing between the members 8 and 14 some positive form of keying, which will be described hereinafter and which is illustrated in Figures 8–16.

In use, the wheel is mounted on the hub in the following manner:

The central part 1 of the wheel is brought into engagement with the stub axle 8 when the tongues 12 are in their unexpanded or release condition. This operation is carried out easily, since there exists certain clearance between the outer diameter of the stub axle 8 and the inner diameter 9 (Figure 1) of the wheel centre or recess 3A. During this movement, the nut 14 is pushed to the right (Figure 4) and the spring 16 is compressed by the end of the screw 4.

The head 6 of the central screw 4 is then turned by screwing (clockwise), which engages the threads of the screw in the central threaded hole 45 in the screw nut 14. By continuing the screwing, the part 17 of the wheel centre will be forced against the disc 13 of the stub axle, at the same time, drawing the nut 14 outwardly, thus causing the tongues 12 to flex in an outwards direction, which will then be brought to bear firmly against the interior of the central part 1 of the wheel, i. e. into their locking position. The wheel is thus exactly centered and firmly locked on the stub axle 8.

Reversely, to dismount the wheel, it is sufficient to turn the screw 4 in the opposite direction in order to push back the screw nut 14 and liberate the wheel, due to the elasticity of the tongues 12 which again take up their normal or release position.

Various embodiments of means by which the locking element 14 is positively held against rotation, with respect to the part 8, will be described hereinafter.

Figures 8 and 9 show one form of keying, consisting of thin plates or laminae 26 arranged in radial planes and fixed on or in the screw nut 14 by any suitable means such as soldering. These plates are sufficiently thin to be capable of entering the slots 11 in the sleeve 8 shown in Figures 2 and 3. Thus, on tightening the central screw 4, the screw nut 14 (Figure 9) is forced towards the left, in such a manner that the laminae 26 engage in the slots 11 at the same time that the surface 24 of the screw nut will bear against the internal surface 25 of the boss of the stub axle.

Figures 10–15 show another means of preventing the screw nut 14 from turning with respect to the sleeve 8 during the tightening of the two parts in relation to one another. For this purpose, the central locking element or screw nut 14 is provided around its periphery with a series of alternate projections 28 and slots 27. The sleeve 8 similarly comprises a series of projections 11B and slots 11A corresponding respectively to the slots 27 and projections 28 of the element 14. To mount the nut 14 in the interior of the sleeve 8, it is possible to insert it from the exterior (direction of arrow c, Figure 14) by relatively turning these two members until they assume the relative positions shown in Figure 11 where the projections on one register with the slots on the other. When this has been done, the nut 14 is turned through a small angle in the direction of the arrow F (Figure 11), in such a manner that the two members take up the relative positions shown in Figure 12, in which the projections 11B of the sleeve obstruct (or overlie) the projections 28 of the screw nut and the slots 27 of the nut register with the slots 11A of the sleeve, when it is no longer possible to withdraw the nut outwardly in the direction of arrow b (Figure 14). To prevent the nut from turning afresh with respect to the stub axle at this moment, a part 31, consisting of a star shaped or spider member 13 (Figure 15) is put into position, the arms 33 of which have projecting flanges 35 adapted to engage in the gaps 30 (Figure 12) formed by slots 27 and the slots 11A which now overlap one another. The star shaped piece 31 is then fixed by any suitable means, such as one or more screws 34 which screw into holes 48 in the part 14, or a screwed washer 40 which is screwed into a projecting lug 41 forwardly from the central locking element 14 (Figure 16). Of course, the spider 13 could be replaced as seen in Figure 12 by a flat ring 31 having a single arm 33 with a projecting flange 35.

It should be understood that it is possible also to place the screw nut 14 in position from the interior of the hub 10, in the direction of the arrow b. This method of positioning does not give rise, in this case, to any difficulty, and the part 31 always serves to prevent the relative rotation of the two members after their relative positioning.

On Figure 7, is shown one preferred form of construction of the threaded hole of the screw nut 14 and in Figure 17 a preferred construction of the corresponding locking screw 4.

In this construction, the screw nut 14 has a threaded opening 45 (Figure 7) and has a bevel or countersink 23 to facilitate introduction of the screw 4, the screw 4 being provided with two shoulders 7, 7A, being set apart to leave a slight space large enough to accommodate the thickness of the central part 1 of the wheel. One or both of these two shoulders 7, 7A, can be formed separately, or provided in one with the screw during manufacture. Thus, the actuating or fixing screw 4, whatever be the direction in which it moves parallel to its axis, carries with it in this movement, with great precision and practically without any play, the centre part 1 of the wheel.

An essential characteristic of this construction of actuating screw is the provision, in front of its screwed part 39, of a cylindrical plain part 38 (Figure 17) whose diameter is equal, with manufacturing tolerance, to the diameter of the base of the threads 39 and whose length is sufficient to permit of entering the screw 4 exactly in the axis of the thread 45 of the screw nut 14, before commencing to turn the screw. This characteristic is of importance, because of the weight of the wheel since, should the screw 4 not be positioned truly coaxial and maintained co-axial with the threaded orifice 45 before screwing and starting screwing will result a displacement of the threads 39 of the lock screw 4 with respect to the threads 45 of the screw nut which will rapidly cause damage to these parts. For this reason the part 38 should have a sufficient length and the calibration of this part should be done with the greatest care.

It is not necessary for the central part 1 of the wheel to have a truncated form which decreases in diameter towards the interior as shown in Figures 1–4. For example in Figure 17 it will be noted that the recess of the central part 1 of the wheel has a cylindrical form (in full lines) or even a conical form (in dotted lines) the taper being directed in the same sense as that of the surfaces 24 and 25 of the central locking nut and of the sleeve of the stub axle.

Satisfactory results have been obtained with a wheel in which the central part 1 is cylindrical and also having its taper in the same direction as that of the surfaces 24, 25. The tightening or locking action obtained by expansion of the sleeve 8 against the inner face of the part 1 is, in effect, sufficient to lock the wheel in place on the stub axle.

In the foregoing construction, the central part 1 of the wheel and the sleeve 8 of the stub axle are of circular section, but it should be understood that satisfactory results can be obtained by giving to these parts a polygonal section. In this alternative embodiment, the internal surface of the recess of the wheel centre 1 is in the form of a truncated pyramid or prism, and the outer surface of sleeve 8 is also of pyramidal or prismatic shape so that on expansion of the sleeve, it will adapt itself to the pyramidal or prismatic internal surface of the wheel recess. As to the interior surface 10 of the sleeve 8, it may be frusto-conical as previously indicated, or have the form of a truncated pyramid, e. g. hexagonal, in which case the screw nut 14 is formed with a corresponding pyramidal outer surface.

The central locking element 14 may be formed of rigid or elastic material, and can, as stated above, comprise one or more parts.

In order to obtain a more definite location of the wheel with respect to the stub axle, corresponding projections and recesses may be provided respectively in the disc 13 of the stub axle and the central annulus 17 of the wheel body against which it bears; such projections and recesses may consist of radially spaced members or be formed as a continuous annular element. In one construction, a stud or studs 18 fixed to the flange 13 of the stub axle engage a corresponding hole or holes 19 in the wheel body 2 (Figure 5); in another arrangement a projection or projections 20 on the body 2 of the wheel engages a corresponding seating or seatings 21 in the stub axle flange 13 (Figure 6).

In a modification, instead of the central part 1 of the wheel being rigid and the stub axle 8 expansible, their operation may be reversed by making the wheel part 1 shrinkable against the stub axle 8 which is then the rigid member. It is also possible to combine the contraction of the part 1 with the expansion of the part 8.

The element which controls the movement of the central locking member 14 can differ from a screw 4. Thus an extension member or actuating rod can be axially fixed to the member 14 and extends through the hole 5 of the wheel centre 1, this rod being screwthreaded to receive an operating nut bearing against part 3 of the wheel.

It is also possible to cause a displacement (towards the exterior) of the locking element 14 or (towards the interior) of the part 3 of the wheel—or of the two together—by means of an eccentric cam mounted to pivot in a place passing through the axis of the wheel, which pivotal mounting may be located on the exterior extremity of a rod (replacing the screw 4, Figure 4) fixed to the part 14, and bearing on the face 3 of the wheel. Such an embodiment is not shown on the drawings, being easily understandable for everybody skilled in the art. It will be understood that the invention is applicable to all types of wheels, such as wheels having a plain body, spoked wheels, etc., for which reason it has been thought sufficient to refer to the central part of the wheel, the rim portion being of no moment.

What I claim is:

1. A mechanism for mounting a wheel on a hub, comprising a vehicle wheel having a centrally located hollow boss therein, said boss having a closed outer end and a smaller open inner end, a vehicle hub having a projection thereon substantially complemental to but smaller than the interior of said boss, said projection engaging in said boss through its open end to align said wheel with said hub, and means to change the relative size of said boss and said projection to bring said projection and said boss into tightly interfitting relation to secure said wheel to said hub.

2. A mechanism for detachably mounting a wheel on a hub, comprising a vehicle wheel having a centrally located laterally offset portion fixed to it and having a cavity therein, a hub having a centrally located projection fixed thereon substantially complemental to said cavity and engageable therein, said offset portion and said projection being relatively expansible and contractile between a position in which said projection fits tightly in said offset portion and said wheel is secured to said hub thereby and another position in which said projection fits loosely in said offset portion and the wheel is detachable from said hub, and means to expand and contract said projection and offset portion relatively.

3. A mechanism for mounting a wheel on a hub comprising an axial hollow projection on said hub, said projection being expansible and contractable in a radial direction, a vehicle wheel having a centrally located boss thereon having a substantially frusto-conical cavity therein to receive said projection loosely when the latter is contracted, said cavity having a smaller open end and a larger closed end, a wedge element carried by the hub and movable axially in said projection to expand and contract said projection, and means mounted on said boss to releasably engage said wedge to move it axially in said projection for expanding said projection into tight engagement with said boss to fix said wheel to said hub.

4. A mechanism for mounting a wheel on a hub comprising an axial hollow projection on said hub, said projection having radially movable portions thereon, a vehicle wheel having a centrally located boss having a tapered recess therein coaxial with said wheel, the smaller end of said recess being open to receive said hollow projection, wedge means movable axially of and within said hollow projection to engage and move its radially movable portions, a screw rotatably mounted in said boss and extending axially of said cavity, said wedge means having a threaded opening to receive said screw, and means to retain said wedge means against rotation relative to said projection, and means on said screw for rotating it to move said wedge means axially and thereby move the radially movable portions in said cavity into interfitting and tight engagement with the boss to fix said wheel to said hub.

5. A mechanism for demountably attaching a wheel to a hub, comprising a hollow axial projection on said hub, said projection having a plurality of lengthwise extending slots therein dividing said projection into a plurality of resilient, radially movable fingers fixed at their inner ends to said hub, camming elements on the inner surfaces of said fingers converging outwardly toward the ends of said fingers, a wedge member mounted in said projection for movement axially thereof, said wedge member engaging said camming elements to move the outer ends of said fingers radially outward upon movement of said wedge member toward the outer ends of said fingers, a vehicle wheel having a centrally located boss extending from one side thereof, said boss having a cavity therein, said cavity having an open end at the other side of said wheel, said open end and cavity being large enough to receive said projection, and means mounted on said wheel and releasably engageable with said wedge member to hold the projection in said cavity and move said wedge member toward the outer ends of said fingers, thereby moving said fingers outwardly in said cavity into tight engagement with said boss to hold said wheel on said hub.

6. The mechanism set forth in claim 5, in which said wedge member and said projection have interfitting elements restraining them against relative rotation.

7. The mechanism set forth in claim 5, in which the wedge member has an axial, threaded bore therein and the means carried by said wheel comprises a screw rotatably mounted in said boss and retained therein against substantial relative axial movement, said screw being engageable in said threaded bore.

8. A mechanism for demountably attaching a wheel to a hub comprising a hollow axial projection on said hub, said projection having a plurality of slots dividing it into a plurality of resilient, radially movable fingers, inclined cam surfaces on the inner sides of said fingers and grooves in said hub between said cam surfaces, a wedge member in said hollow projection having teeth thereon of less width than said grooves to enable said wedge element to be inserted into said hub, means detachably secured to said wedge member and engageable in said grooves to hold said teeth in radial alignment with said cam surfaces, a vehicle wheel having a centrally located cavity therein to receive said projection and means carried by said wheel and detachably engageable with said wedge member to hold said projection in said wheel and move said wedge member relative to said cam surfaces to move said fingers outwardly into tight engagement with said wheel to secure the wheel to the hub.

9. The mechanism set forth in claim 8, in which the means detachably secured to the wedge member comprises a head member secured to said wedge member, said head member having radially extending keys engaging in said grooves and holding said wedge member against rotation relative to said projection.

References Cited in the file of this patent

UNITED STATES PATENTS

| | | |
|---|---|---|
| 1,299,400 | Budd | Apr. 1, 1918 |
| 1,337,271 | Regnier | Apr. 20, 1920 |
| 2,043,111 | Meyer | June 2, 1936 |
| 2,202,667 | Mikulasek | May 28, 1940 |